(12) United States Patent
Carpenter (10) Patent No.: US 12,138,524 B2
(45) Date of Patent: Nov. 12, 2024

(54) BASEBALL GLOVE

(71) Applicant: Marucci Sports, LLC, Baton Rouge, LA (US)

(72) Inventor: Scott Carpenter, Cherry Valley, NY (US)

(73) Assignee: Marucci Sports, LLC, Baton Rouge, LA (US)

( * ) Notice: Subject to any disclaimer, the term of this patent is extended or adjusted under 35 U.S.C. 154(b) by 255 days.

(21) Appl. No.: 17/149,252

(22) Filed: Jan. 14, 2021

(65) Prior Publication Data

US 2022/0219067 A1    Jul. 14, 2022

(51) Int. Cl.
*A63B 71/14*    (2006.01)
*B33Y 80/00*    (2015.01)

(52) U.S. Cl.
CPC ............ *A63B 71/143* (2013.01); *B33Y 80/00* (2014.12); *A63B 2209/00* (2013.01)

(58) Field of Classification Search
CPC ................ A63B 71/143; A41D 13/087; A41D 19/0006; A41D 19/001; A41D 19/01523; A41D 19/01582; A41D 19/01588
See application file for complete search history.

(56) References Cited

U.S. PATENT DOCUMENTS 6,681,401 B1 *  1/2004  Marino ................. A63B 71/143
                                                    2/19
6,766,531 B2 *  7/2004  Sullivano ............. A63B 71/143
                                                    2/19
2005/0251078 A1 * 11/2005 Fleischmann ........ A41D 13/087
                                                    602/22
2007/0226866 A1 * 10/2007 Geyer .................. A63B 71/148
                                                    2/16
2012/0180191 A1 *  7/2012 McNamee ........... A63B 71/143
                                                    2/161.1
2013/0283490 A1 * 10/2013 Rumer ................. A63B 71/143
                                                    2/19
2020/0390169 A1 * 12/2020 Waterloo ........... A41D 19/0065

OTHER PUBLICATIONS

Oxford Languages, Definition of "Ergonomic", https://languages.oup.com/google-dictionary-en, retrieved Dec. 14, 2022. (Year: 2022).*
Merriam Webster Online Dictionary, Definition of "Grooved", https://www.merriam-webster.com/dictionary/grooved, retrieved Dec. 15, 2022. (Year: 2022).*

(Continued)

*Primary Examiner* — Clinton T Ostrup
*Assistant Examiner* — Brianna T. Duckworth
(74) *Attorney, Agent, or Firm* — Jones Walker LLP (57) ABSTRACT

A baseball or softball glove is disclosed that includes a glove shell, a glove liner substantially inside and connected to the glove shell to form a plurality of finger stalls, a thumb stabilizer connected to at least the glove liner and the glove shell and ergonomically shaped to engage the wearer's thumb, and a little finger stabilizer connected to at least the glove liner and the glove shell and ergonomically shaped to engage the wearer's little finger. In another embodiment, the little finger stabilizer is ergonomically shaped to engage the wearer's ring finger and little finger, the "two in the little finger" stabilizer design.

18 Claims, 10 Drawing Sheets

(56) References Cited

OTHER PUBLICATIONS

Merriam Webster Online Dictionary, Definition of "Corrugate", https://www.merriam-webster.com/dictionary/corrugate, retrieved Dec. 15, 2022. (Year: 2022).*

Jerry W., "Injection Molding of Polyethylene", Oct. 24, 2020, https://www.cavitymold.com/injection-molding-of-polyethylene/, CavityMold, retrieved Dec. 12, 2022. (Year: 2020).*

Merriam Webster Online Dictionary, Definition of "Rimmed" and "Rim", https://www.merriam-webster.com/dictionary/rimmed, https://www.merriam-webster.com/dictionary/rim, retrieved Dec. 15, 2022. (Year: 2022).*

Definition of "Thickness", Oxford Languages. https://www.google.com/search?q=thickness+definition&rlz=1C1GCEA_enUS1025US1025&oq=thickness+definition&aqs=chrome.69i57j0i512j0i22i30j0i15i22i30j0i22i30j0i22130l4j0i15i22i30l2.2736j1j1&sourceid=chrome&ie=UTF-8. Accessed Aug. 8, 2023. (Year: 2023).*

\* cited by examiner

BASEBALL GLOVE

BACKGROUND

The present invention relates to a new and improved baseball glove designed to provide the wearer with a more secured fit and more precise function of glove movement with improved grip, leverage and stability Lack of precision in controlling glove movements, lack of fit or comfort, and wear characteristics all hamper a wearer's abilities to maximize their glove's performance on the baseball field. By incorporating lightweight synthetic materials, such as polymer resins, a better performing baseball glove is possible. While most gloves are formed in layers that include a shell, padding, and interior lining, a glove incorporating molded stabilizers provide secured fit, grip, and leverage for greater performance.

Traditional baseball gloves typically contain two catching stays made of thin, flat plastic extending from the inside of the thumb and little finger, and extending above the fingers to help define and strengthen the catching surface of the glove. These catching stays are typically sewn into the padding of the glove or otherwise held in place within the interior glove layers. In traditional glove design, these stays constitute flat pieces of plastic with limited three dimensional shaping ability, although wearers could bend the catching stays into a simple curve generally along a single axis to further open the face of the glove and thus increase its catching surface. For example, U.S. Patent Publ. 2012/0180191 A1, assigned to NIKE® Inc., details a baseball glove having thermally moldable shaping stays embedded in the thumb or little finger sheath, such that when heated beyond a threshold temperature, the embedded stays become temporarily pliable such that the stays can be molded while the threshold temperature is exceeded and retains the molded shape after the stays cool below the threshold temperature, with the molded stays providing a flared glove shape if desired. Manufacturers have also marketed baseball gloves with "flared" thumb and little finger catching stays consisting of a simple curve generally along a single axis, one such example being the LOUISVILLE SLUGGER® Pro Flare baseball glove. Additionally, Carpenter Trade, LLC, of Cooperstown, N.Y., improved the comfort and function of baseball gloves by incorporating molded thumb and little finger stays defining a surface curved on multiple axes, rather than just flat or flared.

Figure 1:
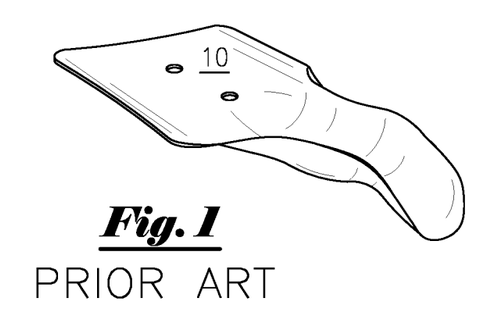
FIGS. 1 through 3 provide multiple views of a prior art thumb stabilizer for a RHT baseball glove.
Figure 2:
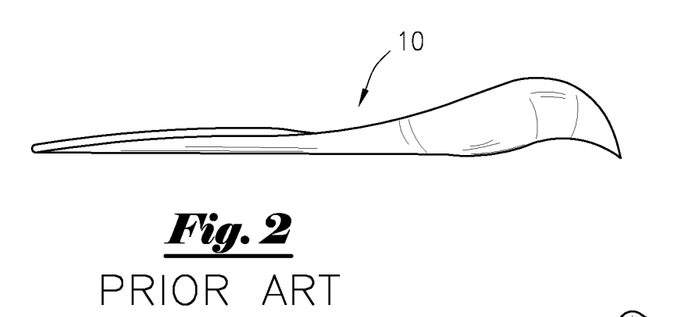
Figure 3:
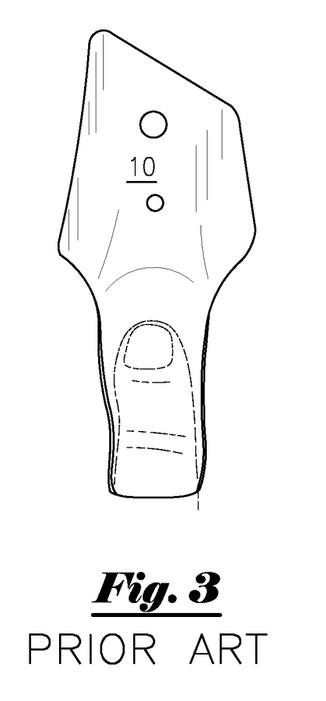
Figure 4:
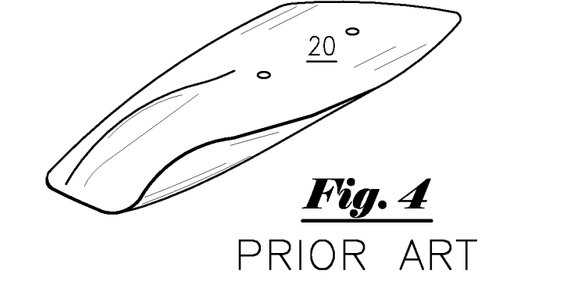
FIGS. 4 through 6 provide multiple views of a prior art little finger stabilizer for a RHT baseball glove.
Figure 5:
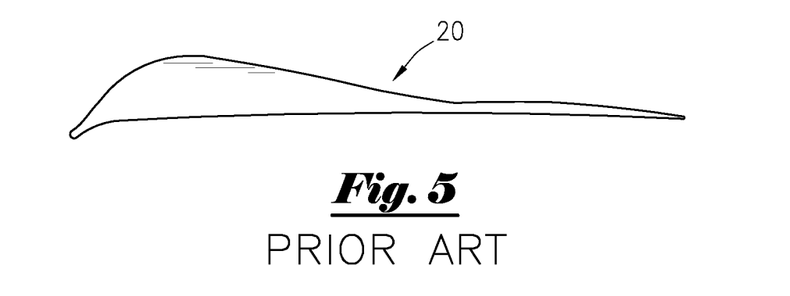
Figure 6:
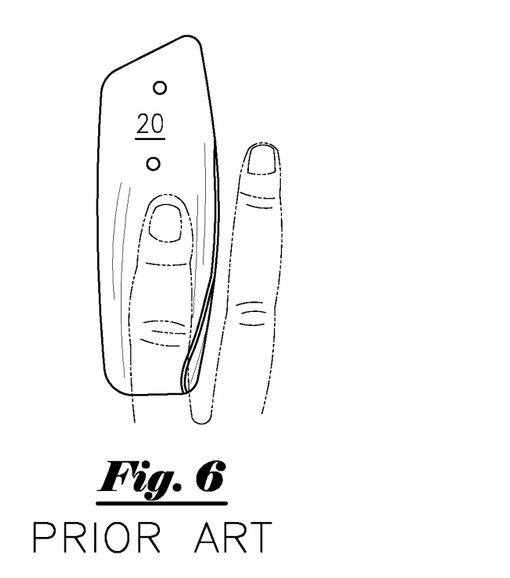

Carpenter Trade, LLC further improved the secured fit and function of baseball gloves by incorporating molded thumb and little finger stabilizers into the lining of the glove, in conjunction with the aforementioned stays. Hand-sculpted plaster molds were made by thermoforming High-Density Polyethylene (HDPE) to form the desired shape of the stabilizers. Thermoforming is a plastic molding technique, whereby thin plastic sheets are heated to a pliable temperature, manipulated to a shape, and then cooled and trimmed to a finished product. A drawback of the thermoforming process is that it is limited to thin walled parts (that are stretched thinner in areas of greater contours) and relatively non-complex shapes. FIG. 1 (iso view), FIG. 2 (side view), and FIG. 3 (top view, thumb shown in phantom lines) illustrate such a prior art thumb stabilizer 10 as used in conjunction with the lining and thumb stay of a baseball glove. Likewise, FIG. 4 (iso view), FIG. 5 (side view), and FIG. 6 (top view, little finger and ring finger shown in phantom lines) illustrate a prior art little finger stabilizer 20 as used in conjunction with the lining and little finger stay of a baseball glove. Note that FIGS. 1-6 show molded stabilizers used in a right handed thrower (RHT) glove, meaning these stabilizers fit the glove on the left hand for a RHT. Not shown are LHT stabilizers (for left handed throwers), which would simply be mirrored images of the stabilizers shown in FIGS. 1-6.

Figure 7:
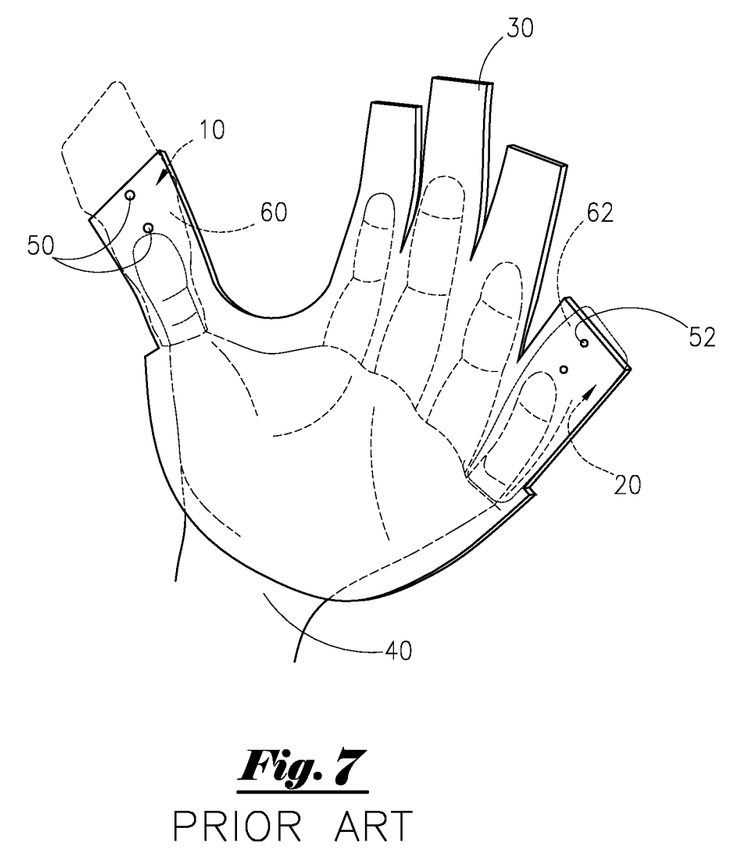
FIG. 7 depicts the prior art stabilizers of FIGS. 1 through 6 in relation to a palm lining for a RHT baseball glove.

FIG. 7 illustrates how the prior art stabilizers 10 and 20 are incorporated into the lining 30 of a baseball glove (not shown) and interact with hand 40. Although well-regarded for improved comfort and glove function, the prior art Carpenter stabilizers 10 and 20 inherently had some shortcomings. The use of heat and reforming to shape the stabilizers would often cause the HDPE to become more brittle than before thermoforming with greater chance of cracking under stress, less flexibility, and product failure at high stress areas 60 and 62. Furthermore, to reduce the probability of cracking, lace holes 50 and 52 were positioned higher above the fingers and further away from the high stress areas 60 and 62, respectively. Higher lace holes are not desirable, however, because of the slack created between the layers—palm shell, palm-side padding, lining, stays, stabilizers, back-side padding, and back shell—which results in instability and—greater potential for layers to shift on impact with a caught ball.

What is needed is a baseball glove designed with improved thumb and little finger stabilizers that are resistant to failure and that provide optimal stabilization of the glove layer components.

SUMMARY OF THE INVENTION

A baseball or softball glove is disclosed consisting of a glove shell, a glove liner substantially inside and connected to the glove shell to form a plurality of finger stalls, a thumb stabilizer connected to at least the glove liner and the glove shell and ergonomically shaped to engage the wearer's thumb, and a little finger stabilizer connected to at least the glove liner and the glove shell and ergonomically shaped to engage the wearer's little finger. In another embodiment, the little finger stabilizer is ergonomically shaped to engage the wearer's ring finger and little finger, the "two in the little finger" stabilizer design.

The thumb stabilizer and the little finger stabilizer described herein are manufactured of a material selected from the group consisting of high density polyethylene (HDPE), low density polyethylene (LDPE), linear low density polyethylene (LLDPE), acrylonitrile butadiene styrene (ABS), polyamide (nylon), high impact polystyrene (HIPS), polypropylene (PP), polycarbonates (PC), epoxy resins, bioplastics, engineered plastics, and engineered resins. The thumb stabilizer and the little finger stabilizer are preferably manufactured by injection molding, but can also be manufactured by a 3D printing process selected from Fused Deposition Modeling (FDM), Stereolithography (SLA), Digital Light Processing (DLP), Selective Laser Sintering (SLS), Selective Laser Melting (SLM), Electron Beam Melting (EMB), Laminated Object Manufacturing (LOM), Binder Jetting (BJ), or Material Jetting/Wax Casting.

The thumb stabilizer and the little finger stabilizer each have varying levels of thickness in specified regions to provide increased strength and resistance to cracking during use of the glove by the wearer. The varying levels of thickness may also include, for example, ribbing, grooved edges, corrugated edges, and rimmed lace holes.

The thumb stabilizer and the little finger stabilizer each comprise at least one lace hole for connecting the stabilizer to the glove liner and the glove shell, wherein at least one of the lace holes is positioned just above the wearer's thumb or little finger, respectively, when wearing the glove. This location provides increased strength to resist cracking under stress.

BRIEF DESCRIPTION OF THE DRAWINGS

The features and advantages of the present invention will be more dearly understood from the following description taken in conjunction with the accompanying drawings in which.

DETAILED DESCRIPTION

The present invention relates to the field of sports equipment. More specifically, this patent details a new and improved baseball glove manufactured and designed using non-traditional elements to provide the wearer with more secured fit and more precise function of glove movement.

In a preferred embodiment of the present invention, a baseball glove is provided having improved thumb and little finger stabilizers. In a first embodiment of the present invention, the stabilizers are preferably manufactured using an injection molding process. In a second embodiment of the present invention, 3D printing techniques are utilized to manufacture the stabilizers, such 3D printing techniques including, but are not limited to, Fused Deposition Modeling (FDM), Stereolithography (SLA), Digital Light Processing (DLP), Selective Laser Sintering (SLS), Selective Laser Melting (SLM), Electron Beam Melting (EMB), Laminated Object Manufacturing (LOM), Binder Jetting (BJ), and Material Jetting/Wax Casting. It is envisioned that other processes well known in the art can also be utilized to manufacture stabilizers of the present invention, such as, without limitation, blow molding and rotational molding.

In another preferred embodiment of the present invention, materials of construction for the thumb and little finger stabilizers are generally HDPE, although other resin materials well known in the art can be utilized, such as, without limitation, low density polyethylene (LDPE), linear-low density polyethylene (LLDPE), acrylonitrile butadiene styrene (ABS), polyamide (nylon), high impact polystyrene (HIPS), polypropylene (PP), polycarbonates (PC), epoxy resins, bioplastics, and other engineered plastics and resins capable of being formed according to certain teachings of the present invention.

Thumb and little finger stabilizers made from HDPE and produced by injection molding, for example, in accordance with certain teachings of the present invention, provide better structural consistency and strength when compared to prior art stabilizers formed by thermoforming techniques, which transformed the HDPE material during processing to become more brittle and uneven. Stabilizers manufactured according to certain teachings of the present invention, have varying levels of optimal thicknesses in specified areas. For example, some areas may be relatively thick and rigid while other areas may be relatively thin and flexible. Additionally, the outer edges of certain areas may be designed with a grooved, or corrugated, edge to provide increased strength and resistance to cracking.

Figure 8:
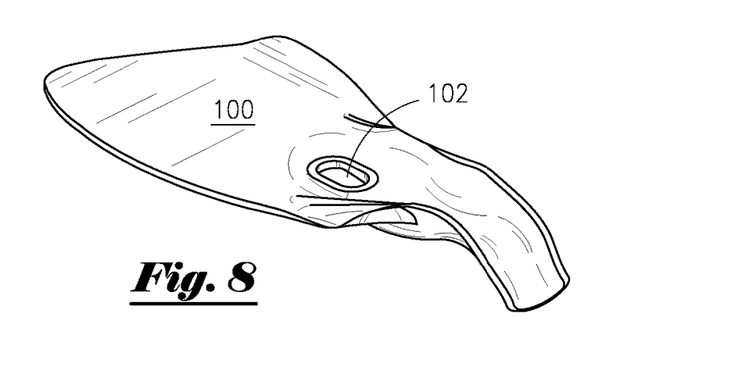
FIGS. 8 through 11 provide multiple views of a thumb stabilizer in accordance with certain teachings of the present invention.
Figure 9:
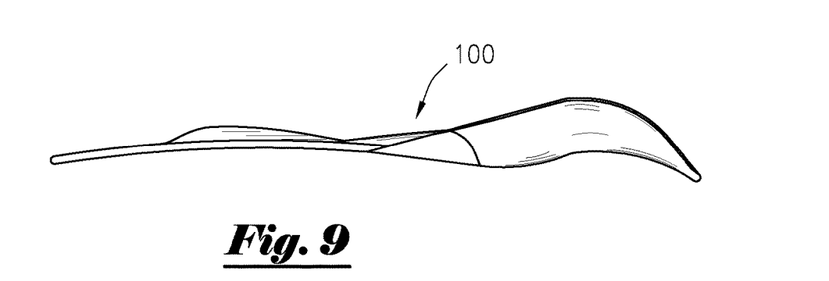
Figure 10:
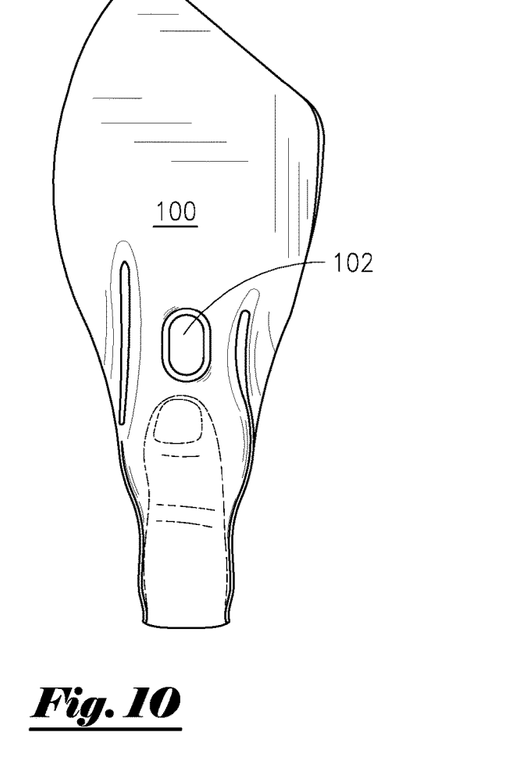
Figure 11:
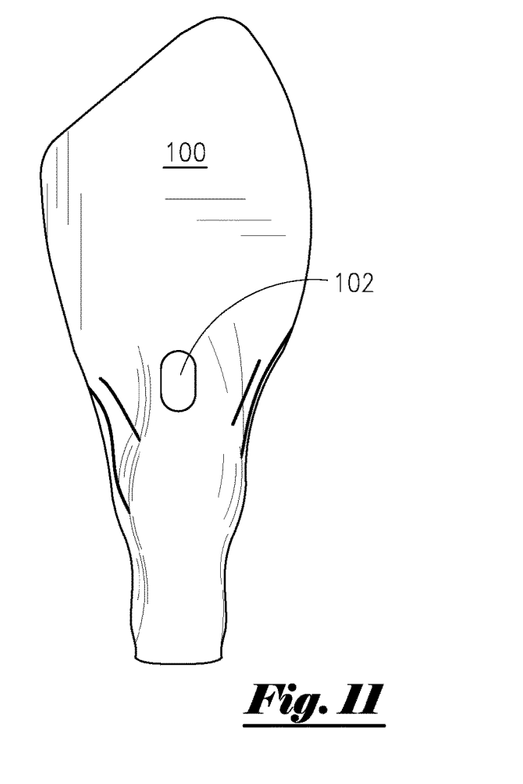
Figure 20:
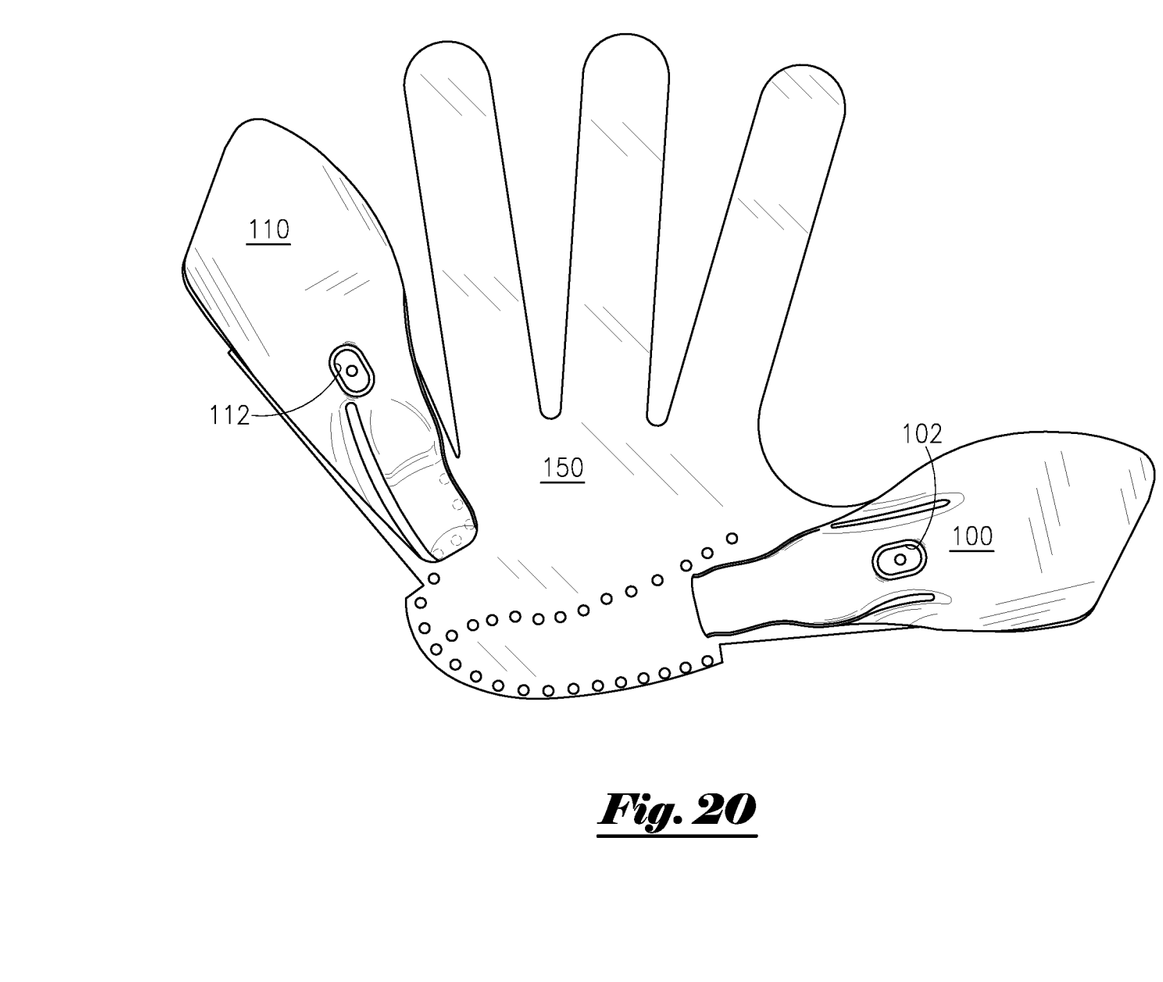
FIG. 20 illustrates a thumb stabilizer and a little finger stabilizer of the present invention relative to a palm lining for a RHT baseball glove.
Figure 21:
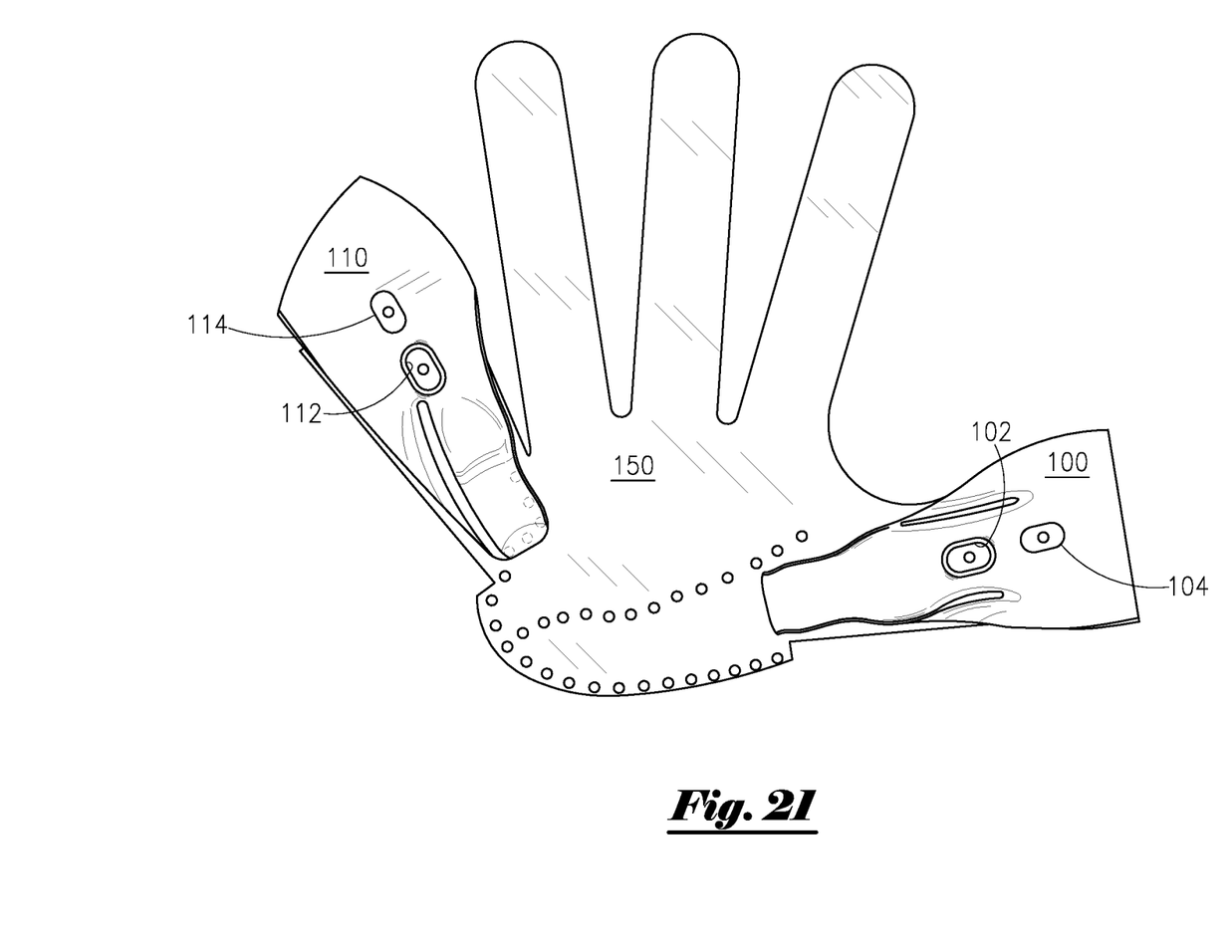
FIG. 21 depicts the arrangement of FIG. 20, with the thumb stabilizer and the little finger stabilizer cut to the size of the palm lining for a RHT baseball glove.
Figure 22:
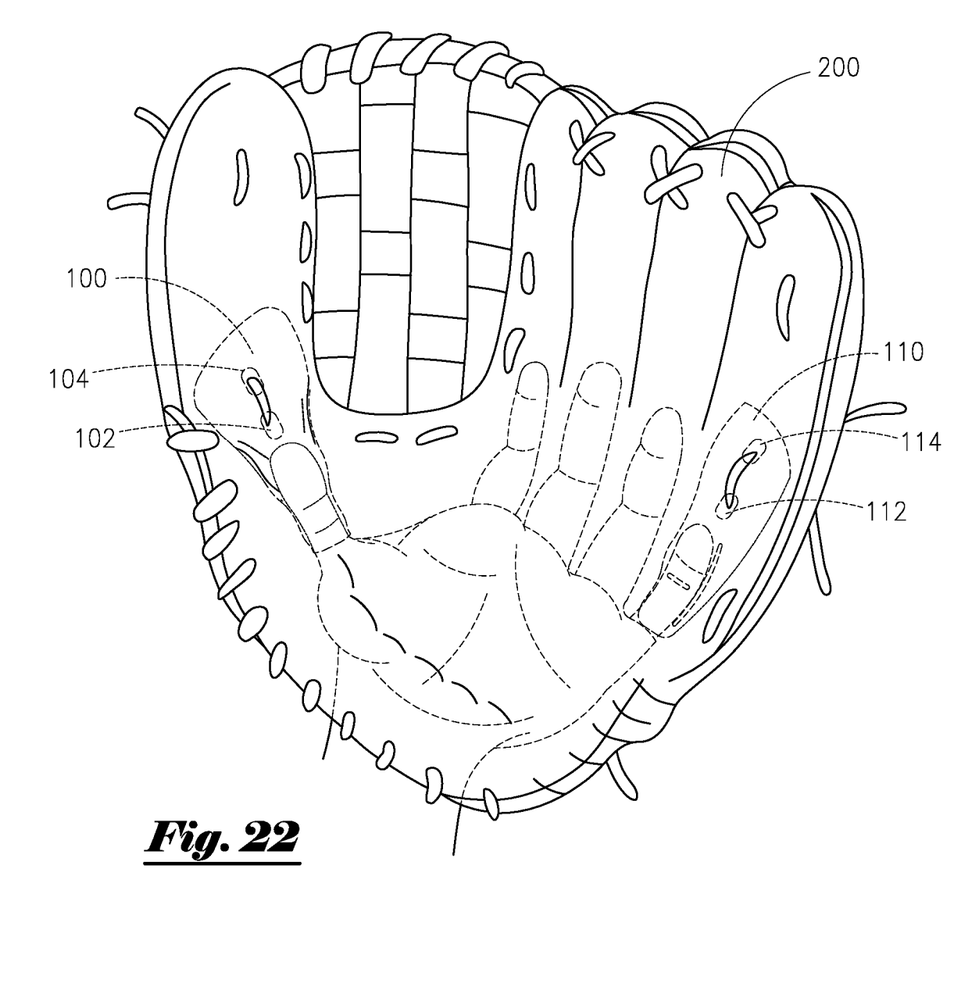
FIG. 22 illustrates a thumb stabilizer and a little finger stabilizer of the present invention relative to a traditional hand position for a RHT baseball glove.

Referring to FIGS. 8 through 11, a thumb stabilizer 100 in accordance with certain teachings of the present invention is depicted (RHT). FIGS. 8 (top iso view), 9 (side view), 10 (top view, thumb shown in phantom lines), and 11 (bottom view) illustrates thumb stabilizer 100, which is designed to ergonomically engage the wearer's thumb, improve grip and leverage, and to interact with the thumb catching stay to improve leverage and control. As such, thumb stabilizer 100 adheres to the lining 150 (as shown in FIGS. 20-21) of a baseball glove 200 using well known techniques in the art, including sewing and gluing, and are attachable through holes in thumb catching stay (not shown) and baseball glove 200 using a lace through lacing holes 102 and 104 (as shown in FIG. 22).

Figure 12:
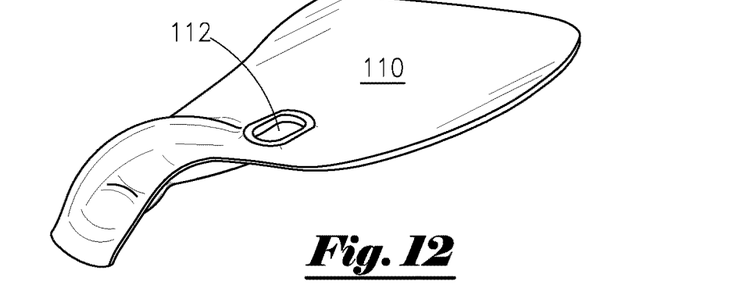
FIGS. 12 through 15 provide multiple views of a little finger stabilizer in accordance with certain teachings of the present invention.
Figure 13:
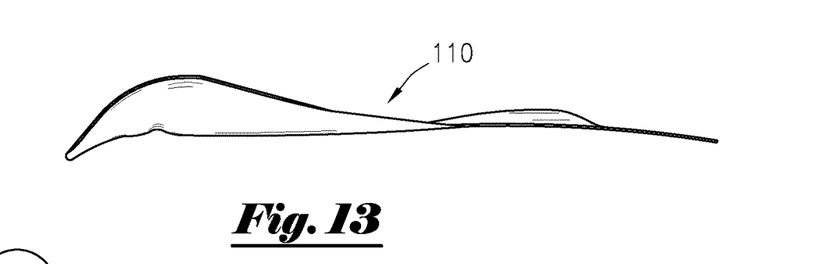
Figure 14:
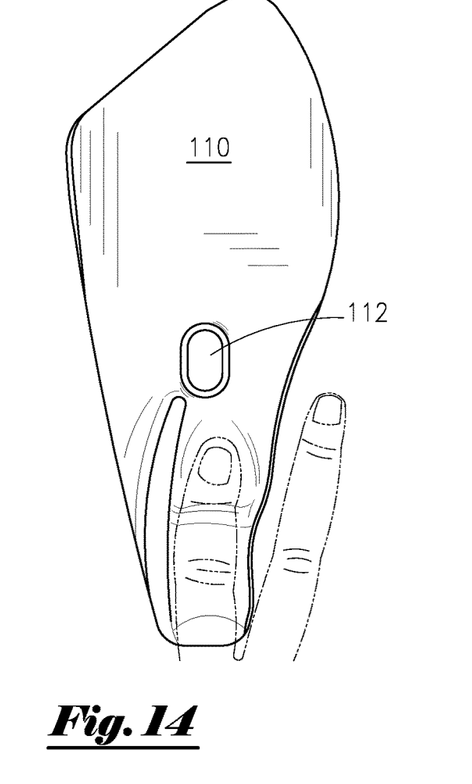
Figure 15:
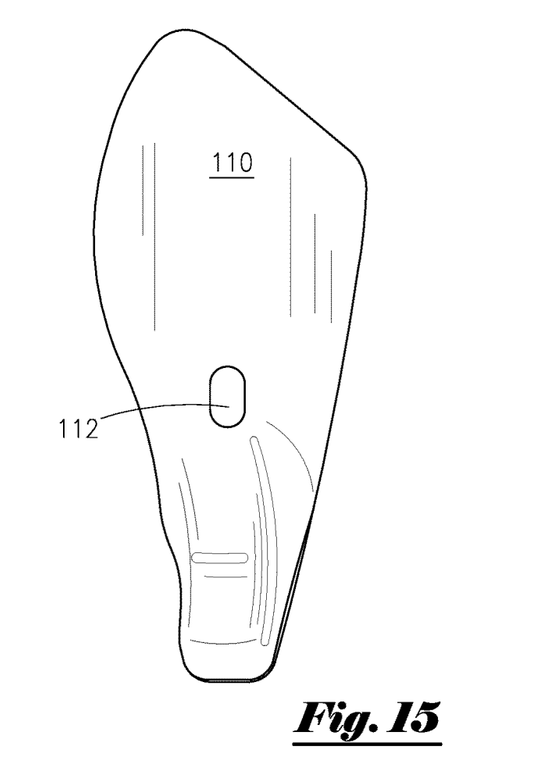

Referring to FIGS. 12 through 15, a little finger stabilizer 110 in accordance with certain teachings of the present invention is depicted (RHT). FIGS. 12 (top iso view), 13 (side view), 14 (top view, little finger shown in phantom lines), and 15 (bottom view) illustrates little finger stabilizer 110, which is designed to ergonomically engage the wearer's little finger, and to interact with the little finger catching stay to improve leverage and control. As such, little finger stabilizer 110 adheres to the lining 150 (shown in FIGS. 20-21) of a baseball glove using well known techniques in the art, including sewing and gluing, and are attachable through holes in little finger catching stay (not shown) and baseball glove 200 using a lace through lacing holes 112 and 114 (as shown in FIG. 22). With reference to FIG. 20 stabilizers 100 and 110 are shown relative to a palm lining 150 for a RHT baseball glove. FIG. 21 illustrates a preferred embodiment for the preparation of the arrangement of FIG. 20 for inclusion in a baseball glove, specifically with the stabilizers cut to the size of the palm lining for the specific glove, and the punching of additional lace holes 104/114 (further illustrated in FIG. 22).

Figure 16:
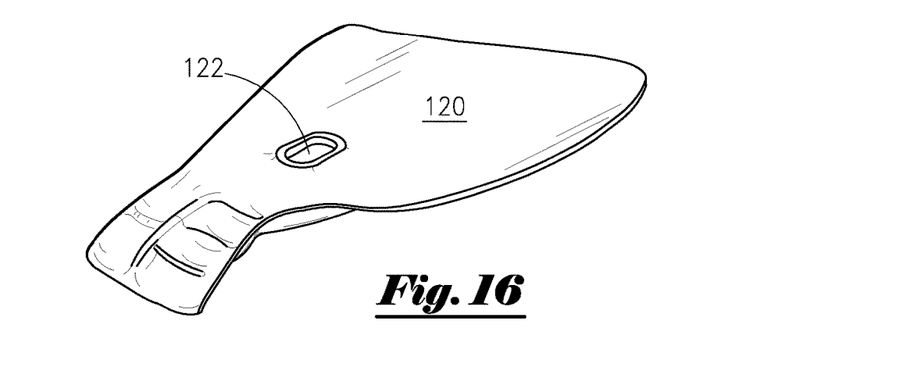
FIGS. 16 through 19 provide multiple views of a "two in the little finger" stabilizer in accordance with certain teachings of the present invention.
Figure 17:
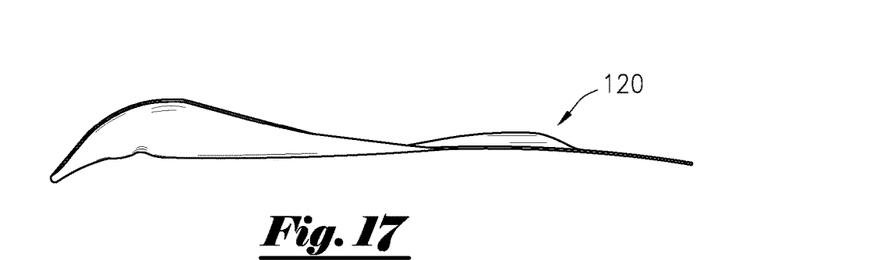
Figure 18:
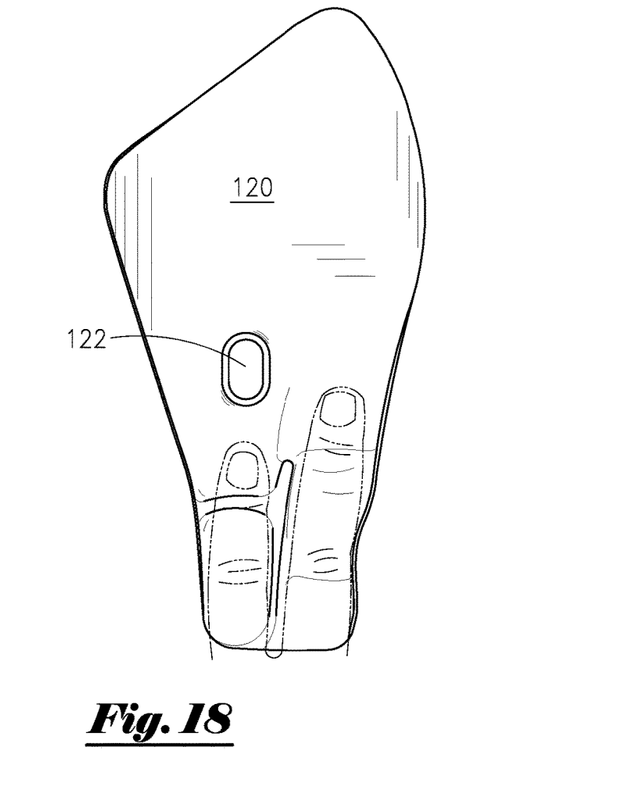
Figure 19:
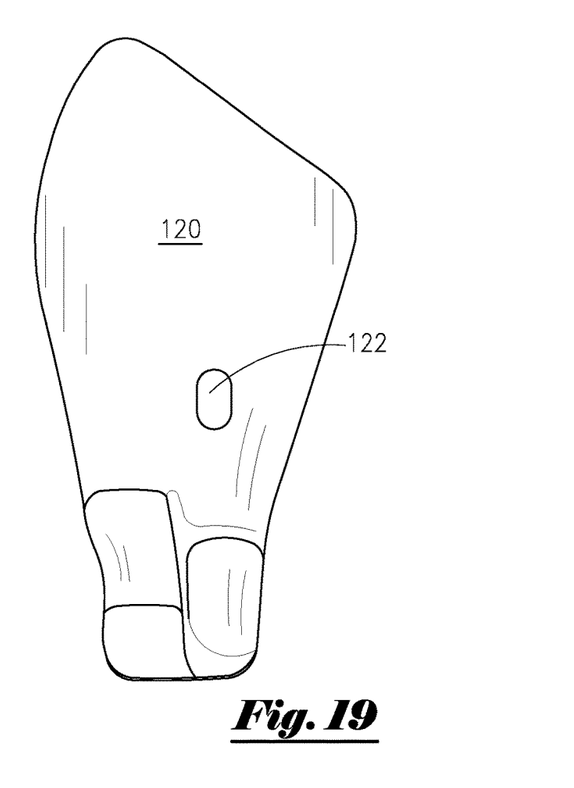
Figure 23:
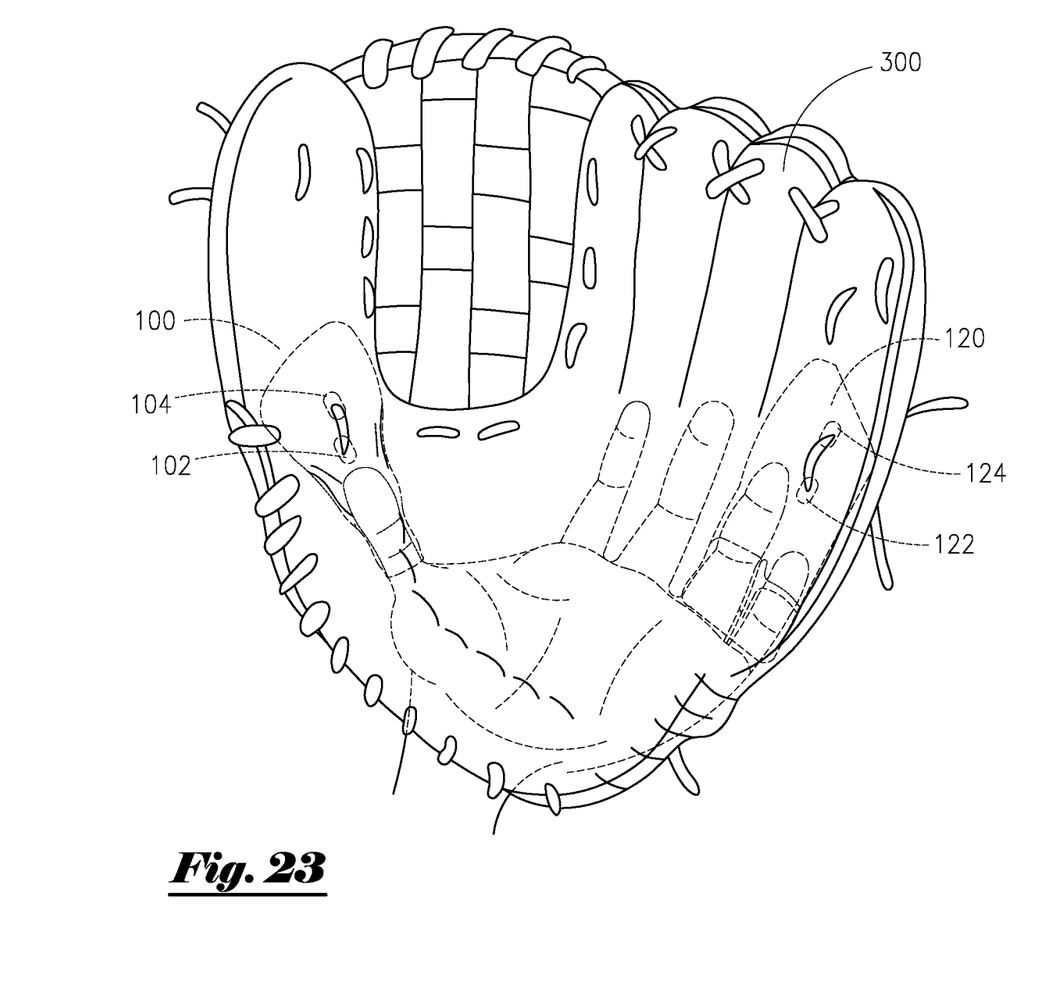
FIG. 23 illustrates a thumb stabilizer and a little finger stabilizer of the present invention relative to a shifted hand position for a RHT baseball glove.

Referring to FIGS. 16 through 19, a "two in the little finger" stabilizer 120 in accordance with certain teachings of the present invention is depicted (RHT). FIGS. 16 (top iso view), 17 (side view), 18 (top view, little finger and index finger shown in phantom lines), and 5d (bottom view) illustrates "two in the little finger" stabilizer 120, which is designed to ergonomically engage both the wearer's little finger and ring finger, and to interact with the little finger catching stay to improve leverage and control. As such, "two in the little finger" stabilizer 120 adheres to the lining of a baseball glove (similar to little finger stabilizer 110 adhering to lining 150 in FIGS. 20-21) using well known techniques in the art, including sewing and gluing, and are attachable through holes in little finger catching stay (not shown) and baseball glove 200 using a lace through lacing holes 122 and 124 (as shown in FIG. 23).

Stabilizers 100/110/120 are molded to cup the respective finger for improved grip, leverage, stability, and lateral support. As illustrated in FIGS. 22 and 23, punched lace holes 104/114/124 match up with laces in the middle of the thumb and little finger stalls of glove 200, with reinforced lace holes 102/112/122 positioned just above the respective thumb and little fingers. Because this area takes a lot of stress from a baseball hitting the palm-side of the glove above the fingers and flexing these extended stays backward, prior art stabilizers placed the lace hole higher above the fingers and further away from the high stress area to avoid increasing the likelihood of cracking. However, higher lace holes resulted in the layers of the glove becoming less tight, thereby reducing the stability of the glove, reducing leverage, and increasing lateral movement. The present invention reduces slack and prevents the layers from shifting on the impact of a caught ball by placing lace holes 102/112/122 more centrally on the stay and on the finger stalls.

This centered hole position is also closer to the fingertips, without increasing the likelihood of cracking. This is achieved by strategically providing varying levels of thickness in all areas of stabilizers 100/110/120—specified areas are strategically engineered to be relatively thick and rigid while other areas need to be relatively thin and flexible. Ribbing may also be provided in certain areas to provide additional rigidity and support. Furthermore, the outer edges of certain areas of stabilizers 100/110/120 are designed with a grooved, or corrugated, edge to further provide increased strength and resistance to cracking. These support features are easily incorporated using the manufacturing processes disclosed hereinabove, allowing lace holes 102/112/122 to be positioned closer to the fingers, thereby improving leverage, stability, and lateral support while resisting cracking.

In a preferred embodiment of the present invention, stabilizers 100/110/120 provide optimal performance when strategically engineered to have different characteristics in different regions. As described above, the region that cups the finger needs to be moderately flexible to accommodate hand sizing, comfort, and desired movement of the fingers. In one preferred embodiment, the thickness of this region ranges from ~0.07 inch to the corrugated edge at ~0.11 inch. The region extending farther above the fingers needs to be very flexible to absorb repeated impacts of a caught ball that will flex the stabilizer in this area. In one preferred embodiment, the thickness in this region can be ~0.07 inch. The region between the finger and the flexible region farther above is more prone to cracking and therefore benefits from engineered strengthening. This region needs to have added rigidity to extend the leverage of the finger toward the glove tips, as well as facilitating lace holes that would otherwise weaken this area without the added strength provided by increased thickness, ribbing, and corrugation. In one preferred embodiment, the lace holes 102/112/122 in this region are rimmed with added thickness (~0.13 inch) to add strength and resist cracking, although it is envisioned that the ribbing in this region can be as high as ~0.28 inch, while other areas in this region are only ~0.09 inch thick.

As discussed above with respect to FIGS. 16 through 19, the "two in the little finger" stabilizer 120, another preferred embodiment of the present invention is a baseball glove designed with a "two in the little finger" stabilizer, wherein a wearer inserts his or her little finger and ring finger into the little finger stall of a baseball glove. FIG. 23 illustrates this embodiment with respect to a RHT glove 300. A person having ordinary skill in the art will appreciate that this "shifted" hand position creates greater leverage and enhances the wearer's ability to close the glove while deepening the pocket. Although many experienced baseball players utilize this shifted hand position in traditional prior art gloves without stabilizers, the present invention uniquely provides a customized, comfortable feel while also providing the aforementioned benefits of the stabilizers of the present invention. FIG. 22, by contrast, illustrates a RHT baseball glove 200 of the present invention having a little finger stabilizer designed for insertion of just the little finger, a traditional hand position that a person having ordinary skill in the art will appreciate provides greater wrist mobility, glove control and creates a natural feel.

Although the above embodiments have been described with respect to a RHT baseball gloves 200/300 and stabilizers 100/110/120, LHT ("left hand thrower") stabilizers and baseball gloves would simply be mirrored images of what is depicted in the figures. Furthermore, although the above embodiments are described with respect to baseball fielding gloves, it is envisioned that the principles of the present invention can be applied to any sports glove, such as softball gloves, hockey gloves, etc. without any undue experimentation. Furthermore, although the above embodiments are described with respect to baseball fielding gloves, it is envisioned that the principles of the present invention can be applied to baseball and softball catching mitts and first base mitts without any undue experimentation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. It is therefore evident that the particular embodiments disclosed above may be altered or modified and all such variations are considered within the scope and sprit of the present invention.

What is claimed is:

1. A baseball or softball glove comprising:
    a glove shell;
    a glove liner substantially inside and connected to the glove shell to form a plurality of finger stalls, the plurality of finger stalls including a thumb stall and a little finger stall, wherein the thumb stall and the little finger stall each have an open proximate end and a closed distal end, and wherein the thumb stall and the little finger stall each have a palm side and a back side;
    a thumb stabilizer positioned adjacent to the palm side of the thumb finger stall and connected to at least one of the glove liner and the glove shell, wherein the thumb stabilizer has a length along an x-axis extending from the open proximate end to the closed distal end of the thumb stall, a width along a y-axis extending from right and left sides of the thumb stall, and a thickness along a z-axis extending from the palm side to the back side of the thumb stall, wherein the thumb stabilizer comprises a proximate region adjacent the open proximate end of the thumb stall, a distal region adjacent to the closed distal end of the thumb stall, and an intermediate region disposed between the proximate region and the distal region;
    a little finger stabilizer positioned adjacent to the palm side of the little finger stall and connected to at least one of the glove liner and the glove shell, wherein the little finger stabilizer has a length along an x-axis extending from the open proximate end to the closed distal end of the little finger stall, a width along a y-axis extending from right and left sides of the little finger stall, and a thickness along a z-axis extending from the palm side to the back side of the little finger stall, wherein the little finger stabilizer comprises a proximate region adjacent to the open proximate end of the little finger stall, a distal region adjacent to the closed distal end of the little finger stall, and an intermediate region disposed between the proximate region and the distal region;

wherein the thickness of the intermediate regions of each of the thumb stabilizer and the little finger stabilizer is greater than the proximate and distal regions.

2. The baseball or softball glove of claim 1, wherein the little finger stabilizer is shaped to engage a wearer's ring finger and little finger.

3. The baseball or softball glove of claim 1, wherein the thumb stabilizer and the little finger stabilizer comprise high density polyethylene (HDPE).

4. The baseball or softball glove of claim 1, wherein the thumb stabilizer and the little finger stabilizer comprise a material selected from the group consisting of high density polyethylene (HDPE), low density polyethylene (LDPE), linear low density polyethylene (LLDPE), acrylonitrile butadiene styrene (ABS), polyamide (nylon), high impact polystyrene (HIPS), polypropylene (PP), polycarbonates (PC), epoxy resins, bioplastics, engineered plastics, and engineered resins.

5. The baseball or softball glove of claim 1, wherein the thumb stabilizer and the little finger stabilizer are manufactured by injection molding.

6. The baseball or softball glove of claim 1, wherein the thumb stabilizer and the little finger stabilizer are manufactured by a 3D printing process.

7. The baseball or softball glove of claim 6, wherein the 3D printing process is selected from the group consisting of Fused Deposition Modeling (FDM), Stereolithography (SLA), Digital Light Processing (DLP), Selective Laser Sintering (SLS), Selective Laser Melting (SLM), Electron Beam Melting (EMB), Laminated Object Manufacturing (LOM), Binder Jetting (BJ), and Material Jetting/Wax Casting.

8. The baseball or softball glove of claim 1, wherein the thumb stabilizer comprises at least one lace hole for connecting the thumb stabilizer to the glove liner and the glove shell, wherein at least one lace hole is positioned within the intermediate region of the thumb stabilizer.

9. The baseball or softball glove of claim 1, wherein the little finger stabilizer comprises at least one lace hole for connecting the little finger stabilizer to the glove liner and the glove shell, wherein at least one lace hole is positioned within the intermediate region of the little finger stabilizer.

10. The baseball or softball glove of claim 1, wherein the thumb stabilizer and the little finger stabilizer each comprise at least one lace hole for connecting each stabilizer to the glove liner and the glove shell, wherein at least one lace hole is positioned within the intermediate region of each of the thumb stabilizer and little finger stabilizer.

11. The baseball or softball glove of claim 1, wherein the thumb stabilizer and the little finger stabilizer further comprise ribbing.

12. The baseball or softball glove of claim 1, wherein the thumb stabilizer and the little finger stabilizer further comprise grooved edges.

13. The baseball or softball glove of claim 1, wherein the thumb stabilizer and the little finger stabilizer further comprise corrugated edges.

14. The baseball or softball glove of claim 1, wherein the thumb stabilizer and the little finger stabilizer further comprise a rimmed lace hole.

15. A baseball or softball glove comprising:
a) a glove shell;
b) a glove liner positioned inside the glove shell and forming a plurality of finger stalls, the plurality of finger stalls including a thumb stall and a little finger stall, wherein the thumb stall and the little finger stall each have an open proximate end and a closed distal end, and wherein the thumb stall and the finger stall each have a palm side and a back side;
c) a thumb stabilizer positioned adjacent to the palm side of the thumb stall and having a length along an x-axis extending from the open proximate end to the closed distal end of the thumb stall, a width along a y-axis extending from right and left sides of the thumb stall, and a thickness along a z-axis extending from the palm side to the back side of the thumb stall, wherein the thumb stabilizer has varying levels of thickness along its length, wherein the thumb stabilizer comprises a proximate region positioned adjacent to the open proximate end of the thumb stall, a distal region positioned adjacent to the closed distal end of the thumb stall, and an intermediate region disposed between the proximate region and the distal region, wherein the average thickness of the intermediate region of the thumb stabilizer is greater than the average thickness of the distal region of the thumb stabilizer; and
d) a little finger stabilizer positioned adjacent to the palm side of the little finger stall and having a length along an x-axis extending from the open proximate end to the closed distal end of the little finger stall, a width along a y-axis extending from right and left sides of the little finger stall, and a thickness along a z-axis extending from the palm side to the back side of the little finger stall, wherein the little finger stabilizer has varying levels of thickness along its length, wherein the little finger stabilizer comprises a proximate region positioned adjacent to the open proximate end of the little finger stall, a distal region positioned adjacent to the closed distal end of the little finger stall, and an intermediate region disposed between the proximate region and the distal region, wherein the average thickness of the intermediate region of the little finger stabilizer is greater than the average thickness of the distal region of the little finger stabilizer.

16. The baseball or softball glove of claim 15, wherein the average thickness of the intermediate regions of the thumb and little finger stabilizers is greater than the proximate regions of the thumb and little finger stabilizers.

17. The baseball or softball glove of claim 15, wherein the average thickness of the proximate regions of the thumb and little finger stabilizers is greater than the distal regions of the thumb and little finger stabilizers.

18. The baseball or softball glove of claim 15, wherein the thumb stabilizer and the little finger stabilizer each comprise at least one lace hole for connecting each stabilizer to the glove liner and the glove shell, wherein the at least one lace hole is formed in the intermediate region of each of the thumb stabilizer and little finger stabilizer.

* * * * *